US012754293B2

(12) United States Patent
Seo et al.

(10) Patent No.: US 12,754,293 B2
(45) Date of Patent: Oct. 6, 2026

(54) SEPARATED TYPE RECEIVING DEVICE FOR LIDAR, TRANSMITTING DEVICE FOR LIDAR AND LIDAR SYSTEM THEREOF

(71) Applicant: ELECTRONICS AND TELECOMMUNICATIONS RESEARCH INSTITUTE, Daejeon (KR)

(72) Inventors: Hong Seok Seo, Daejeon (KR); Bong Ki Mheen, Daejeon (KR)

(73) Assignee: ELECTRONICS AND TELECOMMUICATIONS RESEARCH INSTITUTE, Daejeon (KR)

( * ) Notice: Subject to any disclaimer, the term of this patent is extended or adjusted under 35 U.S.C. 154(b) by 995 days.

(21) Appl. No.: 17/988,014

(22) Filed: Nov. 16, 2022

(65) Prior Publication Data

US 2023/0221413 A1 Jul. 13, 2023

(30) Foreign Application Priority Data

Jan. 12, 2022 (KR) ........................ 10-2022-0004538
Oct. 11, 2022 (KR) ........................ 10-2022-0129480

(51) Int. Cl.
*G01S 7/481* (2006.01)
*G01S 7/487* (2006.01)
*G01S 17/89* (2020.01)

(52) U.S. Cl.
CPC .......... *G01S 7/4815* (2013.01); *G01S 7/4816* (2013.01); *G01S 7/4817* (2013.01); *G01S 7/487* (2013.01); *G01S 17/89* (2013.01)

(58) Field of Classification Search
CPC .... G01S 7/4815; G01S 7/4816; G01S 7/4817; G01S 7/487; G01S 17/89
See application file for complete search history.

(56) References Cited

U.S. PATENT DOCUMENTS 9,733,344 B2 8/2017 Sim et al.
9,857,472 B2 1/2018 Mheen et al.
(Continued)

FOREIGN PATENT DOCUMENTS

KR 10-1997-0036039 A 7/1997
KR 10-2015-0106325 A 9/2015
KR 10-1631133 B1 6/2016

OTHER PUBLICATIONS

G.D. Choi et al., "Development Trends and Expectation of Three-Dimensional Imager based on LIDAR Technology for Autonomous Smart Car Navigation", Electronics and Telecommunications Trends, 2016.

*Primary Examiner* — Jae N Noh
(74) *Attorney, Agent, or Firm* — LRK PATENT LAW FIRM

(57) ABSTRACT

Disclosed herein are separated type receiving device for lidar, transmitting device for lidar and lidar system thereof. The receiving device for Lidar is installed in a moving device and separated from a transmitting apparatus for Lidar fixed to a fixed body. The receiving apparatus for Lidar includes: an object beam detection module configured to detect an object beam which is a beam received after being transmitted from the transmitting apparatus for Lidar and reflected from a neighboring object of the moving device; and a reception controller configured to generate Lidar data based on information associated with the transmitted beam and a signal of the object beam.

17 Claims, 7 Drawing Sheets

(56) References Cited

U.S. PATENT DOCUMENTS

| | | | | |
|---|---|---|---|---|
| 2005/0137786 | A1 | 6/2005 | Breed et al. | |
| 2016/0327648 | A1* | 11/2016 | Lipson | G01S 17/74 |
| 2020/0076152 | A1* | 3/2020 | Eichenholz | G02B 26/125 |
| 2020/0111358 | A1* | 4/2020 | Parchami | G05D 1/028 |
| 2020/0200896 | A1 | 6/2020 | Shan | |

* cited by examiner

SEPARATED TYPE RECEIVING DEVICE FOR LIDAR, TRANSMITTING DEVICE FOR LIDAR AND LIDAR SYSTEM THEREOF

CROSS REFERENCE TO RELATED APPLICATIONS

The present application claims priority to a Korean patent application 10-2022-0004538, filed Jan. 12, 2022, and 10-2022-0129480, filed October 11, the entire contents of which are incorporated herein for all purposes by this reference.

BACKGROUND OF THE INVENTION

1. Field of the Invention

The present disclosure relates to a receiving device for Lidar and a transmitting device for Lidar, which are separated from each other, and a Lidar system, and more particularly, to a receiving device for Lidar and a transmitting device for Lidar, which are operated in separation from each other, and a Lidar system that is not only fabricated at a low cost but also prevents confusion and implements a same function by making receiving modules share a transmitting module, while an existing system, in which transmitting and receiving modules are configured as a single device, is subject to confusion caused by a light source reflected from another Lidar system.

2. Description of Related Art

The light detection and ranging (Lidar) apparatus is an image sensor apparatus for obtaining a three-dimensional image, and its installation and utilization covers various fields including an autonomous driving robot or vehicle and an apparatus for detecting whether a structure is modified or whether an artificial or natural facility is damaged by a disaster.

Instead of building up an image from an external light, a Lidar apparatus irradiates a light source in the air, measures a light reflected from a neighboring object and then outputs a good-quality 3D image of the neighboring area, which enables the apparatus to be used conveniently irrespective of the surrounding environment.

A Lidar can measure a distance to an object by irradiating a laser light source to a neighboring object and measuring the return light. A pulse light source and a continuous wave (CW) light source are used as light source. As the pulse light source is advantageous for measuring a long distance and the technical advances have achieved a resolution of several centimeters (cm), a pulse-based method is applied more frequently than a CW-based method.

FIG. 1 is a view schematically illustrating a configuration of a conventional Lidar apparatus.

The conventional Lidar apparatus 10 includes a transmitting module 20 for externally irradiating a light in a beam form and a receiving module 30 for detecting a beam reflected from a target 40. The transmitting module 20 has a light source 22 for emitting a pulse-type laser light and a beam scanner 24 for externally irradiating an emitted laser light. The receiving module 30 measures a distance to the target 40 by means of a detected light and generates a three-dimensional image of a surrounding environment.

The conventional Lidar apparatus 10 may accommodate the transmitting module 20 and the receiving module 30 in a single housing and be installed in a particular object, for example, a moving vehicle or a driving robot. The Lidar apparatus 10 may be installed in a moving object and generate a three-dimensional image of a surrounding environment while the moving object is running.

The receiving module 30 consists of an optical element for receiving a beam, a light detection sensor and a processing circuit, and since such components are cheap, the receiving module 30 can be manufactured at a low cost. On the other hand, since the light source 22 and the beam scanner 24, which are components of the transmitting module 20, are expensive compared to those of the receiving module 30, the transmitting module 20 accounts for about 90% of a production cost of the Lidar apparatus 10. This is an obstacle to mass production of Lidar for satisfying various demands. Furthermore, since a light source emitted from the transmitting module 20 illustrated in FIG. 1 can interfere with a receiving module of another apparatus, a resulting problem may be a malfunction of a Lidar system.

SUMMARY

A technical object of the present disclosure is particularly not only to manufacture a Lidar system at a low cost but also to provide a receiving device for Lidar and a transmitting device for Lidar, which are operated in separation from each other, and a Lidar system that implements a same function as an existing system in which transmitting and receiving modules are configured as a single device.

The technical objects of the present disclosure are not limited to the above-mentioned technical objects, and other technical objects that are not mentioned will be clearly understood by those skilled in the art through the following descriptions.

According to the present disclosure, there is provided a receiving apparatus for Lidar. The receiving apparatus for Lidar is installed in a moving device and separated from a transmitting apparatus for Lidar fixed to a fixed body. The receiving apparatus for Lidar comprising: an object beam detection module configured to detect an object beam which is a beam received after being transmitted from the transmitting apparatus for Lidar and reflected from a neighboring object of the moving device; and a reception controller configured to generate Lidar data based on information associated with the transmitted beam and a signal of the object beam.

According to the embodiment of the present disclosure in the receiving apparatus for Lidar, the apparatus may further comprise a transmit beam detection module configured to detect a beam transmitted directly to the receiving apparatus for Lidar as a transmit beam among beams of the transmitting apparatus for Lidar. The transmit beam detection module may be further configured to identify at least one of an irradiation direction of the transmit beam, an angle of the transmit beam, an emitting position of the transmit beam, an emitting time of the transmit beam and an emitting repetition rate of the transmit beam. Information obtained from the transmit beam may be beam scan information that includes at least one of the irradiation direction, the angle, the emitting position, the emitting time and the emitting repetition rate.

According to the embodiment of the present disclosure in the receiving apparatus for Lidar, the reception controller may be further configured to recognize the transmit beam as a trigger signal and to generate the Lidar data by referring to the beam scan information obtained from the transmit beam, the trigger signal, and the signal of the object beam, and the trigger signal may be a signal initiating an analysis of the signal of the object beam and include wavelength information of the transmit beam.

According to the embodiment of the present disclosure in the receiving apparatus for Lidar, the transmit beam detection module may be provided to detect the transmit beam behind the moving device along a travel direction of the moving device, and the object beam detection module may be provided to detect the object beam in front of the moving device.

According to the embodiment of the present disclosure in the receiving apparatus for Lidar, the information associated with the transmitted beam may be beam scan information that is transmitted from the transmitting apparatus for Lidar through a communication unit of the receiving apparatus for Lidar. The reception controller may be further configured to generate the Lidar data by referring to the beam scan information and the signal of the object beam. The beam scan information may include at least one of an irradiation direction of the beam, an angle of the beam, an emitting position of the beam, and an emitting repetition rate of the beam.

According to the embodiment of the present disclosure in the receiving apparatus for Lidar, the information associated with the transmitted beam further may include beam trigger information that is transmitted from the transmitting apparatus for Lidar through the communication unit of the receiving apparatus for Lidar. The reception controller may be further configured to generate the Lidar data by referring to the beam scan information, the beam trigger information and the signal of the object beam. The beam trigger information may include an emitting time of the beam and a wavelength of the beam.

According to the embodiment of the present disclosure in the receiving apparatus for Lidar, the reception controller may be further configured to: obtain an intensity of light according to the object beam and a reception time of the object beam, based on the signal of the object beam, and generate the Lidar data, based on the intensity of light, the reception time and the information associated with the transmitted beam.

According to the embodiment of the present disclosure in the receiving apparatus for Lidar, when there is a plurality of the transmitting apparatuses for Lidar, beams of different wavelengths may be output for each of transmitting apparatuses for Lidar. The reception controller may be further configured to select a beam with an intensity equal to or above a threshold as the information associated with the transmitted beam among beams received from each of the transmitting apparatuses for Lidar.

According to the embodiment of the present disclosure in the receiving apparatus for Lidar, in response to an already received beam having an intensity below the threshold and a newly received beam having an intensity equal to or above the threshold, which is from another transmitting apparatus for Lidar different from a transmitting apparatus for Lidar outputting the already received beam, the reception controller may be further configured to: change the information associated with the transmitted beam from the already received beam to the newly received beam, and generate Lidar data based on the changed information and a signal obtained from an object beam that is received after being reflected by the newly received beam.

According to another embodiment of the present disclosure, there is provided a transmitting apparatus for Lidar. The transmitting apparatus for Lidar comprises a light emitting module configured to output a light; a beam scanner configured to outwardly irradiate the output light as a beam; and a transmission controller configured to control the light emitting module to output a light with a wavelength among a plurality of wavelengths to the beam scanner.

According to the embodiment of the present disclosure in the transmitting apparatus for Lidar, when there is a plurality of the transmitting apparatuses for Lidar are spaced apart from each other, the transmission controller may be further configured to control the light emitting module to output a light with a wavelength different from a wavelength of a beam irradiated from the transmitting apparatuses for Lidar that are spaced apart from each other.

According to the embodiment of the present disclosure in the transmitting apparatus for Lidar, the transmission controller may be further configured to control the light emitting module to output lights with at least two wavelengths alternately among the plurality of wavelengths.

According to the embodiment of the present disclosure in the transmitting apparatus for Lidar, the light emitting module may comprise: a plurality of source light sources; a first light amplification module combined with each of the source light sources and provided for each of the plurality of wavelengths and amplifies a light of the source light sources; a pumping light source that adds a pumping light to the light in order to amplify the light of the source light sources; and a second light amplification module provided for each of the plurality of wavelengths and reamplifying the amplified light by inputting the amplified light and the pumping light and outputting the reamplified light to the beam scanner.

According to the embodiment of the present disclosure in the transmitting apparatus for Lidar, the transmission controller may be further configured to transmit beam scan information to the receiving apparatus for Lidar, which is for reference in order to generate Lidar data based on the beam received by the receiving apparatus for Lidar. The beam scan information may include at least one of an irradiation direction of the beam, an angle of the beam, an emitting position of the beam, an emitting time of the beam, and an emitting repetition rate of the beam.

According to the embodiment of the present disclosure in the transmitting apparatus for Lidar, the transmission controller may be further configured to transmit, to the receiving apparatus for Lidar, beam trigger information, which is for reference in order to generate Lidar data based on the beam received by the receiving apparatus for Lidar, and the beam trigger information may include an irradiation time of the beam and wavelength information of the beam.

According to another embodiment of the present disclosure, there is provided a Lidar system comprising at least one transmitting device for Lidar and a receiving device for Lidar that are operated in separation from each other. The transmitting device for Lidar is installed to be fixed to a fixed body and comprises: a light emitting module configured to output a light; a beam scanner configured to outwardly irradiate the output light as a beam; and a transmission controller configured to control the light emitting module and the beam scanner. The receiving device for Lidar is installed in a moving device and comprises: an object beam detection module configured to detect an object beam which is a beam received after being transmitted from the transmitting apparatus for Lidar and reflected from a neighboring object of the moving device; and a reception controller configured to generate Lidar data based on information associated with the transmitted beam and a signal of the object beam.

The features briefly summarized above for this disclosure are only exemplary aspects of the detailed description of the disclosure which follow, and are not intended to limit the scope of the disclosure.

The technical problems solved by the present disclosure are not limited to the above technical problems and other technical problems which are not described herein will be clearly understood by a person (hereinafter referred to as an ordinary technician) having ordinary skill in the technical field, to which the present disclosure belongs, from the following description.

According to the present disclosure, it is possible not only to manufacture a Lidar system at a low cost but also to provide a receiving device for Lidar and a transmitting device for Lidar, which are operated in separation from each other, and a Lidar system that implements a same function as an existing system in which transmitting and receiving modules are configured as a single device.

Specifically, in the present disclosure, as transmitting and receiving devices for Lidar, which constitute a Lidar system, may be configured as independent unit apparatuses respectively, they may be installed in separate objects to be physically distant from each other. As a result, receiving devices mounted in a plurality of moving devices may share the beam signal and scan signal of an expensive transmitting device that is separately installed in a neighboring object of the moving devices. Thus, while the production cost of a Lidar system, which is mostly incurred by a transmission function, may be reduced, Lidar data thus obtained may still be the same as the one from an existing system.

Effects obtained in the present disclosure are not limited to the above-mentioned effects, and other effects not mentioned above may be clearly understood by those skilled in the art from the following description.

DETAILED DESCRIPTION

Figure 1:
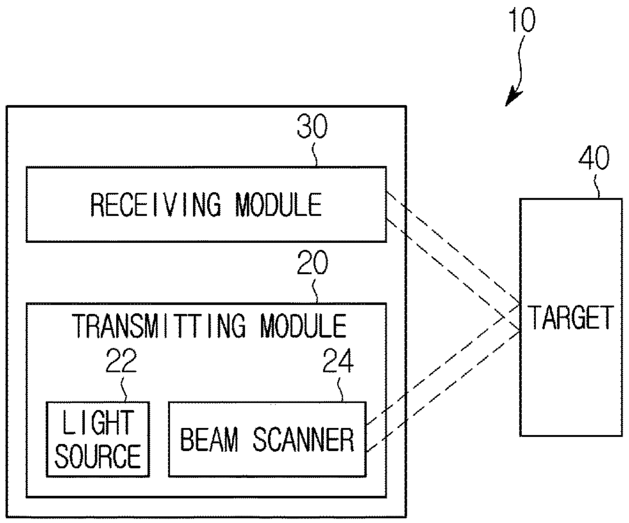
FIG. 1 RELATED ART
FIG. 1 is a view schematically illustrating a configuration of a conventional Lidar apparatus.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements.

Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

In the present disclosure, each of phrases such as "A or B", "at least one of A and B", "at least one of A or B", "A, B or C", "at least one of A, B and C", ""at Each of the phrases such as "at least one of A, B or C" and "at least one of A, B, C or combination thereof" may include any one or all possible combinations of the items listed together in the corresponding one of the phrases.

In the present disclosure, expressions of location relations used in the present specification such as "upper", "lower", "left" and "right" are employed for the convenience of explanation, and in case drawings illustrated in the present specification are inversed, the location relations described in the specification may be inversely understood.

Hereinafter, embodiments of the present disclosure will be described with reference to the accompanying drawings.

Figure 2:
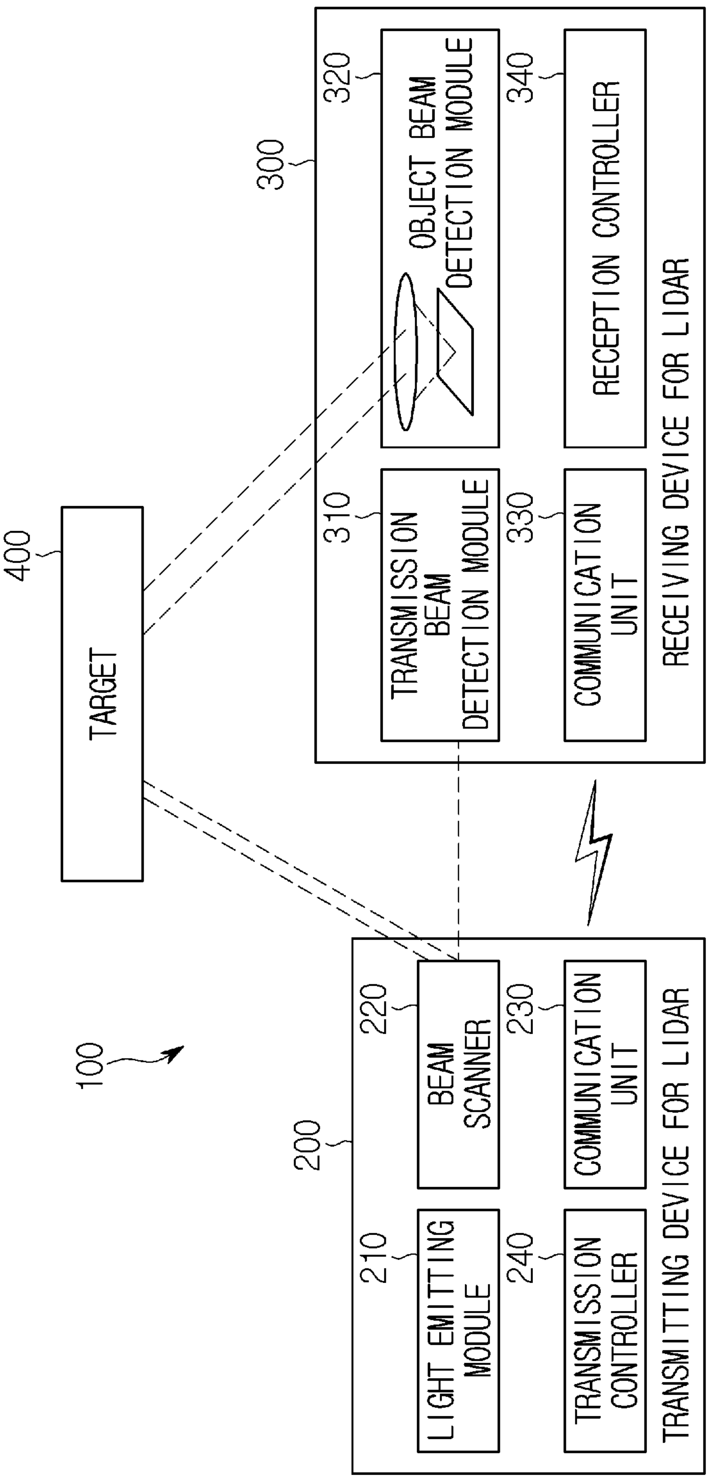
FIG. 2 is a view illustrating a configuration of a Lidar system according to an embodiment of the present disclosure.

FIG. 2 is a view illustrating a configuration of a Lidar system according to an embodiment of the present disclosure.

A Lidar system 100 may include a transmitting device 200 for Lidar and a receiving device 300 for Lidar that are separately operated as separate devices. The transmitting device 200 for Lidar may externally irradiate a light in a beam form. The receiving device 300 for Lidar may detect a beam, which is received after the irradiated beam is reflected from an object, for example, a target 400, and generate Lidar data based on information associated with the detected beam and a beam that is transmitted directly from the transmitting device 200 for Lidar. The directly transmitted beam may mean the irradiated beam which is propagated without being reflected from an object. Specifically, the irradiated beam may not be reflected from another object, and a device, which first receives the irradiated beam, may be a transmit beam detection module 310 of the transmitting device 200 for Lidar. Lidar data may include a measured distance from the target 400 near a moving device and a three-dimensional image of a surrounding environment.

Hereinafter, for convenience of description, the transmitting device 200 for Lidar and the receiving device 300 for Lidar may be described with the abbreviations of the transmitting device 200 and the receiving device 300 respectively.

The transmitting device 200 may be fixed on an object, and the receiving device 300 may be installed in a moving device. An object in which the transmitting device 200 is installed may be fixed in a specific place or be a moving object. In order to generate Lidar data, the transmitting device 200 may be installed preferably in a fixed object in a specific place, and in this case, it may be provided as a fixed type. For example, the fixed object may be a structure or facility near a path in which a moving device is expected to run. In case a moving device is a vehicle, the fixed object may be a traffic light near a road or a road facility. A plurality of the transmitting devices 200 may be installed in a fixed type along a road. A moving device, on which the receiving device 300 is mounted, may be a device with mechanical or passive mobility. For example, a moving device may be a manned or unmanned vehicle, an autonomous driving vehicle, an autonomous driving robot, a drone, a flying object operated by a person, a ship, and a portable mobile device carried by a user.

The transmitting device 200 may include a light emitting module 210, a beam scanner 220, a communication unit 230, and a transmission controller 240.

The light emitting module 210 may output a light with one of a plurality of wavelengths to the beam scanner 220. As exemplified in FIG. 7, the transmitting device 200 may irradiate a beam in a driving direction of a moving device 500, and a plurality of the transmitting devices 200 may be fixed by being separated from each other. In this case, in order to avoid interference between beams irradiated from each transmitting device 200 and to enable the receiving device 300 mounted on the moving device 500 to identify a beam irradiated from the plurality of transmitting devices 200, a transmitting device 200 may generate a light with a wavelength, which is selected from a plurality of wavelengths, to output the light with a wavelength different from a wavelength of a beam irradiated from another transmitting device 200. For example, the transmitting device 200 may emit a light with a specific wavelength according to wavelength information of another transmitting device 200, which is transmitted from a management system controlling a plurality of transmitting devices 200 or from the another transmitting device 200, or according to an instruction of the management system.

In addition, the light emitting module 210 may output alternately lights with at least two wavelengths among a plurality of wavelengths that can be output, in order to prevent a beam interference with another transmitting device 200. For example, the transmitting device 200 may alternately emit lights with a plurality of wavelengths by referring to wavelength information of another transmitting device 200, which is propagated from a management system or the another transmitting device 200, or by referring to an instruction of the management system.

Figure 3:
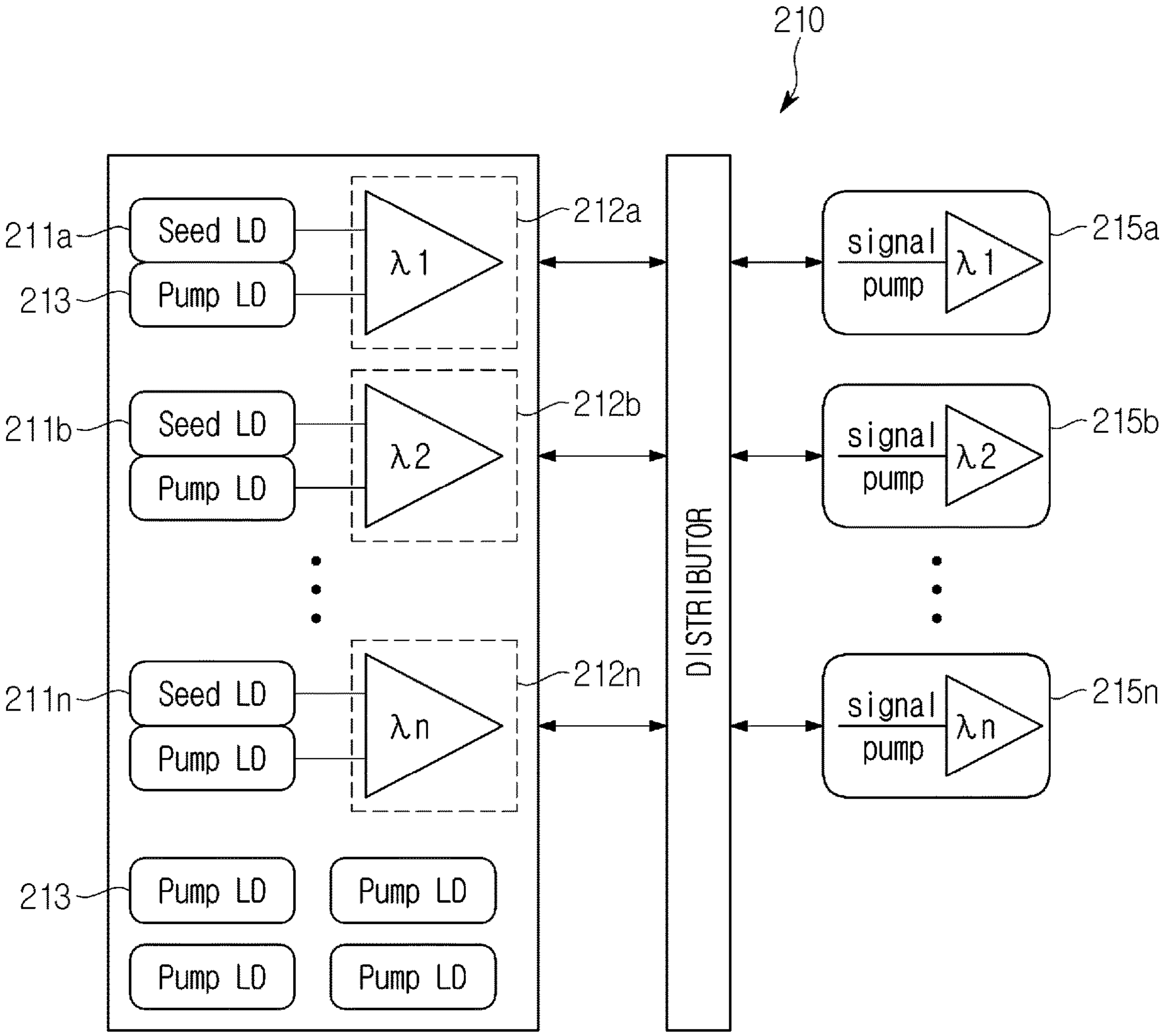
FIG. 3 is a view exemplifying a configuration of a light emitting module in a transmitting device for Lidar according to an embodiment of the present disclosure.

The light emitting module 210 for implementing the above-described content may be configured as exemplified in FIG. 3. FIG. 3 is a view exemplifying a configuration of a light emitting module in a transmitting device for Lidar according to an embodiment of the present disclosure.

The light emitting module 210 may be equipped with a plurality of source light sources 211*a* to 211*n*, first light amplification modules 212*a* to 212*n*, a pumping light source 213, a distributor 214, and second light amplification modules 215*a* to 215*n*.

The source light sources 211*a* to 211*n* may be configured as a laser diode, and two or more seed light sources with distributed feedback (DFB) type laser diode form may be used. Each of the source light sources 211*a* to 211*n* may emit pulse-type laser lights with different wavelengths. As another example, each of the source light sources 211*a* to 211*n* may emit laser lights with a same wavelength of pulse, and the laser lights may be transformed by the first light amplification modules 212*a* to 212*n* to have different wavelengths.

The first light amplification modules 212*a* to 212*n* may be combined with the source light sources 211*a* to 211*n* respectively, be provided for each of a plurality of wavelengths, and thus amplify lights of the source light sources 211*a* to 211*n*. Furthermore, in order to amplify the lights of the source light sources 211*a* to 211*n*, the first light amplification modules 212*a* to 212*n* may add a pumping light, which is input from the pumping light source 213, to the lights.

The distributor 214 may transmit lights, which have been amplified through the first light amplification modules 212*a* to 212*n*, to the second light amplification modules 215*a* to 215*n* with corresponding wavelengths. Furthermore, the distributor 214 may propagate a pumping light of the pumping light source 213 to the second light amplification modules 215*a* to 215*n* with corresponding wavelengths.

The second light amplification modules 215*a* to 215*n* may be provided at each of a plurality of wavelengths, input an amplified light and a pumping light to reamplify the amplified light, and output the reamplified light to the beam scanner 220.

In the above-described configuration, the light emitting module 210 may not only emit a light with a wavelength, which is selected among a plurality of wavelengths, but also amplify the emitted light, thereby outputting a beam with a wavelength different from a beam wavelength of another transmitting device 200 at a high power. Specifically, a plurality of light amplification modules for amplifying the emitted light, for example, the first and second light amplification modules 215*a* to 215*n* may be provided at each wavelength, and the emitted light may be propagated to the first and second light amplification modules 215*a* to 215*n* corresponding to a selected wavelength. For example, a light with a specific wavelength may be transmitted to the corresponding second amplification stages 215*a* to 215*n* through an optical fiber of the distributor 214. In addition, a pumping light of the pumping light source 213 may also be propagated a corresponding light amplification module through the distributor 214. The first light amplification modules 212*a* to 212*n* connected with the source light sources 211*a* to 211*n* may be installed in a place that is adjacent to the second light amplification modules 215*a* to 215*n* and has smooth power supply and a sufficient space, and the second light amplification modules 215*a* to 215*n* may be installed in a higher place than a vehicle on a road and be connected to a light distributor. The first light amplification modules 212*a* to 212*n* may be configured to include a primarily amplified light source, which is input through an optical fiber, and a final amplification stage based on a pumping light source. A light, which is amplified in the second light amplification modules 215*a* to 215*n*, may be emitted through a collimator (herein not illustrated), pass through the beam scanner 220 and then be output as a final pulse in the air.

The present disclosure exemplifies two light amplification modules for optical amplification but is not limited thereto and may be implemented by multi light amplification modules. In addition, the light emitting module 210 is described based on FIG. 3, but this does not exclude any embodiment satisfying a configuration that emits and amplifies a light with any one wavelength among a plurality of wavelengths.

Figure 4:
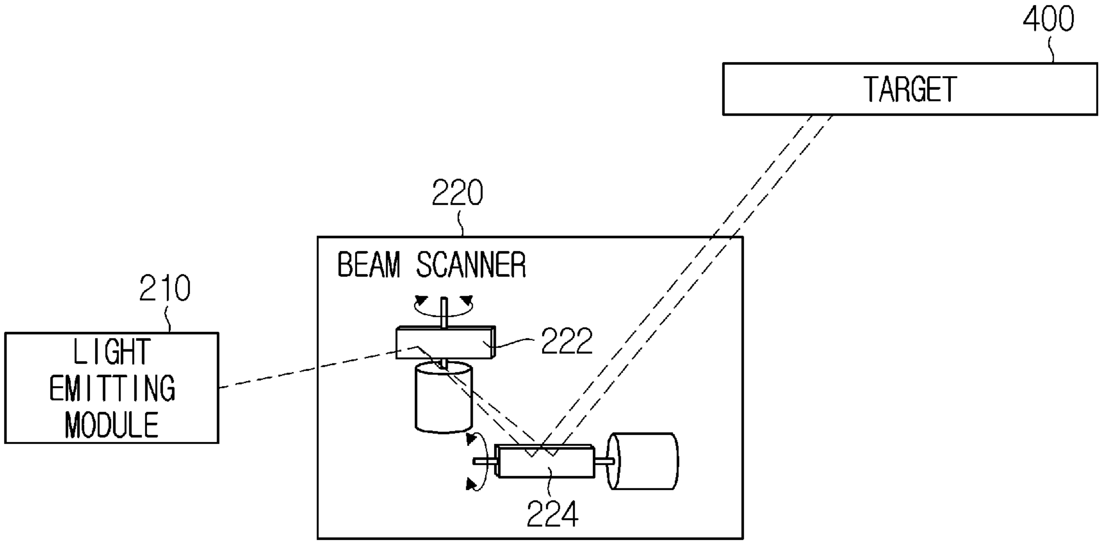
FIG. 4 is a view exemplifying a configuration of a beam scanner in a transmitting device for Lidar according to an embodiment of the present disclosure.

The beam scanner 220 may externally irradiate a light with a specific wavelength, which is output from the light emitting module 210, in a form of beam. For example, a light output from the light emitting module 210 may be collimated through a collimator for the purpose of long-distance travel of a beam, and the beam scanner 220 may receive a collimated light. The beam scanner 220 may be configured to irradiate a beam with a two-dimensional plane form, which is exemplified in FIG. 4. FIG. 4 is a view exemplifying a configuration of a beam scanner in a transmitting device for Lidar according to an embodiment of the present disclosure.

The beam scanner 220 may have a longitudinal scanner 222 for diffusing a beam so that a light can be scanned in the horizontal direction perpendicular to a light travel direction and a transverse scanner 224 for diffusing the horizontally-scanned beam so that it can be scanned in the vertical direction. Through the two scanners, scanning may be performed so that the plane of a beam perpendicular to a beam travel direction has a rectangular shape. In the present disclosure, the beam scanner 220 is described based on FIG. 4, but this does not exclude any configuration with a rectangular scanning shape.

Referring to FIG. 2 again, apart from beam irradiation, the communication unit 230 may wirelessly transmit and receive various signals and information with an external device. For example, the communication unit 230 may transmit, to the receiving device 300, reference information that the receiving device 300 receiving a beam will refer to for generating Lidar data, or may transmit and receive various types of information like information on a beam wavelength and an indication to and from a management system or another transmitting device 200. For example, the reference information may be beam scan information, beam trigger information and the like.

The transmission controller 240 may control an overall operation of the transmitting device 200. Specifically, based on the above-described wavelength information, the transmission controller 240 may control the light emitting module 210 to output a light with a wavelength different from a wavelength of a beam irradiated from a separate transmitting device 200, so that the light emitting module 210 can emit a light with a wavelength which is selected among a plurality of wavelengths. In addition, to avoid signal interference with a beam of another transmitting device 200, the transmission controller 240 may control, based on wavelength information, the light emitting module 210 to alternately output lights with at least two lights among a plurality of wavelengths.

In addition, as an example, the transmission controller 240 may generate beam scan information and deliver the beam scan information to the receiving device 300 receiving a beam through the communication unit 230. As another example, the transmission controller 240 may control beam scan information not to be transmitted to the receiving device 300 but to be sent in a broadcast form. For example, the beam scan information may include at least one of an irradiation direction of a beam, an angle of the beam, an emitting position of the beam, and an emitting repetition rate of the beam. As an example, the transmission controller 240 may generate beam trigger information and transmit the beam trigger information to the receiving device 300 receiving a beam through the communication unit 230. As another example, the transmission controller 240 may control beam trigger information not to be transmitted to the receiving device 300 but to be sent in a broadcast form. Beam trigger information may include an irradiation time of a beam, wavelength information of the beam, and location information of the transmitting device 200. Reference information including beam scan information and/or beam trigger information may be transmitted based on a setting/policy of the transmission controller 240 or at a request of the receiving device 300.

Referring to FIG. 2 again, the receiving device 300 may include the transmit beam detection module 310, an object beam detection module 320, a communication unit 330, and a reception controller 340.

The transmit beam detection module 310 may detect a beam directly transmitted from the transmitting device 200. As described above, the directly transmitted beam may mean a beam of the transmitting device 200, which is received by the transmit beam detection module 310 from the transmitting device 200 without being reflected from a target. In the present document, the directly transmitted beam described above is referred to as a transmit beam, and the terms "directly transmitted beam" and "transmit beam" may be used interchangeably. A directly transmitted beam may be recognized as a trigger signal associated with a beam, which is reflected from a target and is received by the receiving device 300, and beam scan information. A trigger signal may be a signal for initiating an analysis of information associated with an object beam, which is reflected from the target 400 and is received, and may operate as an internal trigger in the receiving device 300. Herein, the object beam may be a beam of the transmitting device 200, which is received after being reflected from neighboring targets 400 of a moving device 500. By analyzing information associated with an object beam received after being reflected from the target 400 through a trigger signal, a distance to the target may be known through the receiving device 300.

In addition, a trigger signal may include reference information that is necessary to generate Lidar data. Specifically, a trigger signal may be analyzed by the reception controller 340, and beam trigger information may be obtained from the trigger signal. The beam trigger information may include a reception time of a trigger signal, wavelength information of a transmit beam, and the like.

In addition, when the transmit beam detection module 310 is configured as an array fast detector or a quadrant fast detector, it may obtain data like trigger signal information from a beam irradiated from the transmitting device 200, an irradiation direction of the beam, and an angle of the beam. That is, the transmit beam detection module 310 may identify at least one of an irradiation direction of a transmit beam, an angle of the transmit beam, an emitting position of the transmit beam, an emitting time of the transmit beam, or an emitting repetition rate of the transmit beam. Information obtained from a transmit beam may be beam scan information that includes at least one of the irradiation direction, the angle, the emitting position, the emitting time, and the emitting repetition rate. The beam scan information may obtain angle change information of a transmit beam in the transmit beam detection module 310. Specifically, by analyzing information associated with an object beam received and reflected from the target 400 through an angle change, an image of an object may be constructed which is reflected from the target 400 and received by the receiving device 300 for Lidar. Thus, without the communication unit 330, a three-dimension Lidar signal may be configured through a signal reflected from the target 400 and data obtained by the transmit beam detection module 310.

As another example, the transmit beam detection module 310 may be omitted, and beam trigger information may be delivered from the transmitting device 200. For example, the reception controller 340 may select beam trigger information with the same wavelength information as that of a received object beam among pieces of beam trigger information received from a plurality of transmitting devices 200. For example, beam trigger information may include wavelength information of a beam, an irradiation time of the beam, and beam scanning information of the transmitting device 200.

In addition, in case the transmit beam detection module 320 is omitted or a detector of the transmit beam detection module 320 is configured as a wide-angle detector based on a single sensor, the reception controller 340 may receive beam scan information from the transmitting device 200 associated with an object beam at a request or by a broadcast of the transmitting device 200. The reception controller 340 may select beam scan information with the same wavelength information as that of a received object beam among pieces of beam scan information received from a plurality of transmitting devices 200. The beam scan information may include at least one of trigger signal information, an irradiation direction of a beam, an angle of the beam, and an emitting position of the beam.

Figure 5:
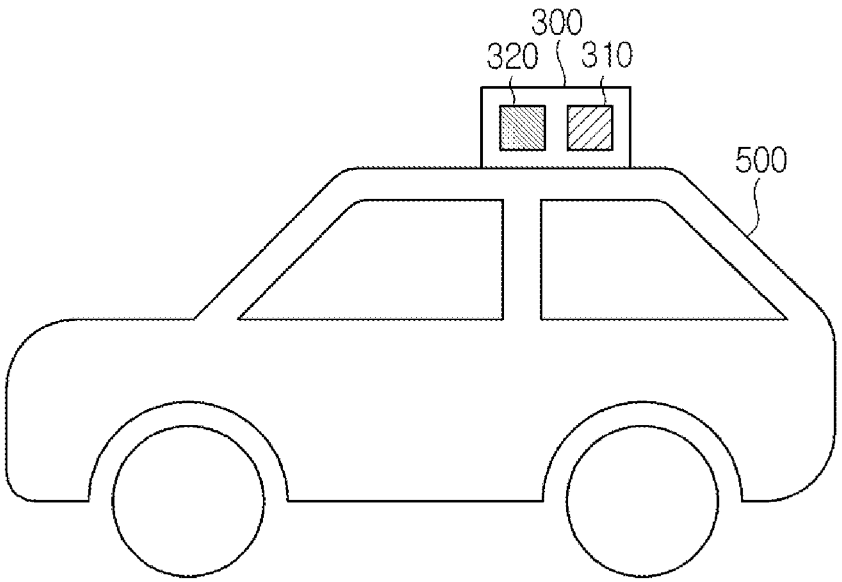
FIG. 5 is a view exemplifying a receiving device for Lidar mounted on a moving device in accordance with an embodiment of the present disclosure.

As exemplified in FIG. 5, in order to easily detect a transmit beam, the transmit beam detection module 310 may be provided to detect a transmit beam behind the moving device 500 along the travel direction of the moving device 500. FIG. 5 is a view exemplifying a receiving device for Lidar mounted on a moving device in accordance with an embodiment of the present disclosure.

The object beam detection module 320 may be configured to detect an object beam that is emitted from the transmitting device 200 and is reflected from the target 400 in front of the moving device 500. The object beam detection module 320 may measure an intensity of light in the received object beam and record a reception time of the object beam. Referring to FIG. 2, the object beam detection module 320 may include a lens 322, on which an object beam is incident, and a detector 324 for detecting the incident object beam. The object beam detection module 320 may further include a filter between the lens 322 and the detector 324. As exemplified in FIG. 5, in order to easily detect an object beam, an object beam detection module may be installed to detect an object beam in front of the moving device 500 along the travel direction of the moving device 500.

As an example, the detector 324 may identify at least one of an irradiation direction of an object beam, an angle of the object beam, and an emitting position of the object beam. To this end, as an example, an array fast detector or a quadrant fast detector may be used as the detector 324. As another example, the detector 324 may be configured as a wide-angle detector based on a single sensor. In this case, even when receiving an object beam, the detector 324 cannot identify the irradiation direction, the angle, and the emitting position.

Apart from beam reception, the communication unit 230 may wirelessly transmit and receive various signals and information with an external device. For example, the communication unit 330 may receive, from the transmitting device 200, reference information to be referenced for generating Lidar data, or may transmit and receive various types of information like wavelength information of a beam output from each transmitting device 200 and identification information of each transmitting device 200 to and from a management system or each transmitting device 200. The reference information may be the above-described beam scan information, beam trigger information and the like.

The reception controller 340 may generate Lidar data based on information associated with a transmitted beam and a signal of a received object beam. Lidar data may be a distance to the neighboring target 400 of the moving device 500 and a three-dimensional image of a surrounding environment.

In case there is a plurality of transmitting devices 200, the reception controller 340 may select a beam with an intensity equal to or above a threshold among beams received from each of the transmitting devices as a beam-related signal. Specifically, among a plurality of transmit beams input through the transmit beam detection module 310, a transmit beam with an intensity equal to or above a threshold may be selected as a trigger signal. In addition, among a plurality of object beams received by the object beam detection module 320, the reception controller 340 may control an object beam with a same wavelength as that of a selected transmit beam to be finally received. As another example, in case the transmit beam detection module 310 is omitted, the reception controller 340 may control an object beam with an intensity equal to or above a threshold to be finally received among a plurality of object beams received by the object beam detection modules 320. As yet another example, in case a plurality of beams has an intensity equal to or above a threshold, the reception controller 340 may generate Lidar data by using a beam with a greatest intensity.

The reception controller 340 may obtain beam trigger information by using a trigger signal. In case the transmit beam detection module 310 uses an array fast detector or a quadrant fast detector, the reception controller 340 may obtain beam scan information based on an irradiation direction of a transmit beam, an angle of the transmit beam and an emitting position of the transmit beam, which are identified through the detector 324. The reception controller 340 may generate Lidar data based on beam scan information, beam trigger information, a reception time of an object beam, and a light intensity of the object beam. Specifically, using a reception time difference between a trigger signal and an object beam and beam scan information, the reception controller 340 may measure a distance to the target 400 and generate a three-dimensional image based on the measured distance and an angle change.

As another example, the reception controller 340 may control to obtain beam scan information from the transmitting device 200 associated with an object beam and generate Lidar data based on the obtained beam scan information, a trigger signal, a reception time difference between object beams, and an intensity of light. Herein, the beam scan information may be an irradiation direction of a beam, an angle of the beam, and an emitting position of the beam.

As other example, when receiving trigger information through the communication unit 230, the reception controller 340 may generate Lidar data based on at least beam trigger information, beam scan information, a reception time of an object beam, and an intensity of light. When receiving a trigger signal according to a transmit beam and further receiving beam trigger information, the reception controller 340 may generate Lidar data by considering a reception time of the trigger signal as well as the above-described information.

Meanwhile, in case an intensity of a beam (or an object beam), which is already received, is below a threshold and an intensity of a beam newly received from another transmitting device different from the transmitting device of the already-received beam is equal to or above the threshold, the transmit beam thus received may be changed from the already-received beam to the newly-received beam. The reception controller 340 may generate Lidar data based on information obtained from the changed transmit beam and a corresponding object beam.

Figure 6:
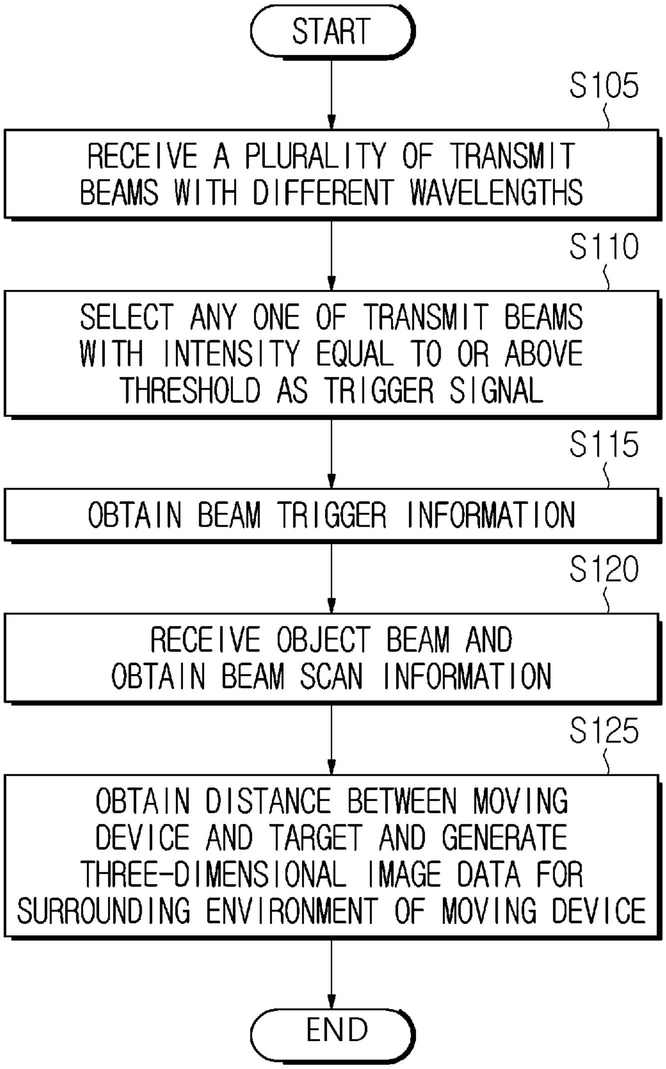
FIG. 6 is a flowchart depicting an operation of a Lidar system according to an embodiment of the present disclosure.
Figure 7:
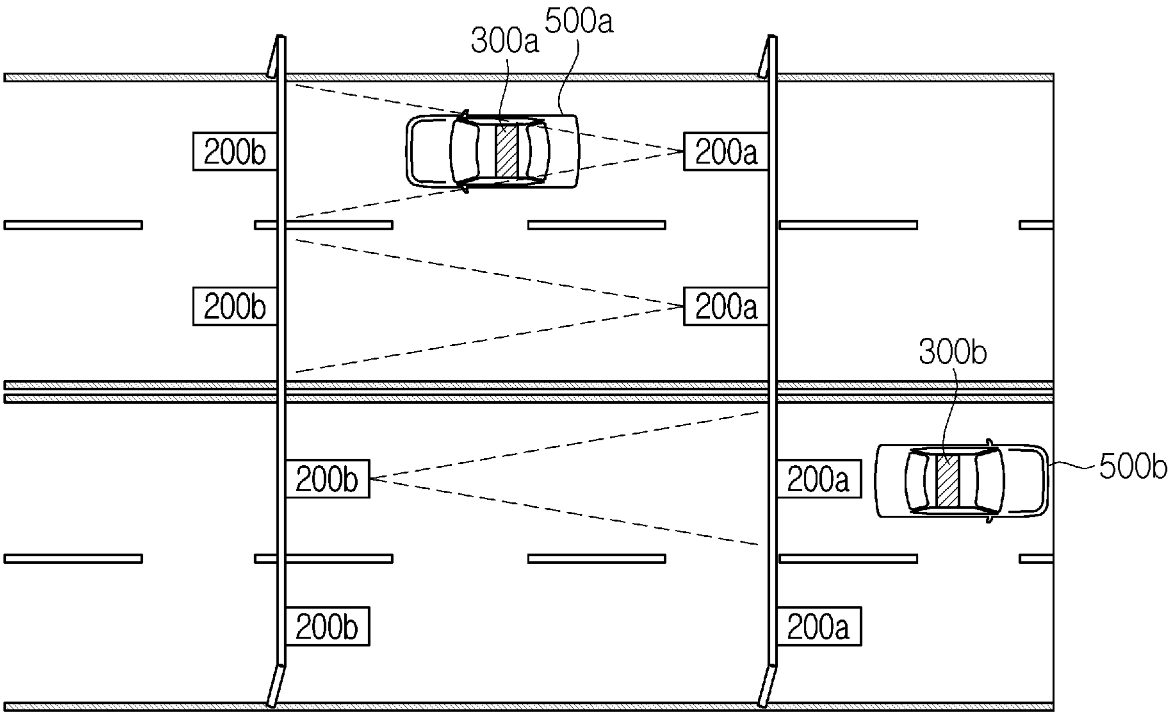
FIG. 7 is a view exemplifying an implementation of a Lidar system according to an embodiment of the present disclosure.

Hereinafter, with reference to FIG. 1 to FIG. 7, an operation of a Lidar system will be described according to an embodiment of the present disclosure. FIG. 6 is a flowchart depicting an operation of a Lidar system according to an embodiment of the present disclosure. FIG. 7 is a view exemplifying an implementation of a Lidar system according to an embodiment of the present disclosure.

Hereinafter, an operation process will be described under the assumption that the receiving devices 300*a* and 300*b* for Lidar have the transmit beam detection module 310, and the transmit beam detection module 310 identifies at least one of an irradiation direction of a transmit beam, an angle of the transmit beam and an emitting position of the transmit beam.

To facilitate understanding, an operation process according to FIG. 6 is based on a situation exemplified in FIG. 7. FIG. 7 exemplifies fixed-type transmitting devices 200*a* and 200*b* installed on a road and a receiving device for Lidar installed on a plurality of moving devices 500*a* and 500*b* running on the road, for example, a plurality of vehicles. The transmitting devices 200*a* and 200*b* may be installed on a road facility in order to transmit a beam to the moving devices 500*a* and 500*b* on the road. The plurality of moving devices 500*a* and 500*b* may receive a beam based on a laser pulse light source of the transmitting devices 200*a* and 200*b* at the same time on the road where they are running.

A distance between the transmitting devices 200*a* and 200*b* may be determined according to a laser output power and a pulse repetition rate of each transmitting device 200. Accordingly, the distance between the transmitting devices 200*a* and 200*b* may be determined through a suitable test according to the above-described contents of respective transmitting device 200*a* and 200*b*. Each transmitting device 200*a* and 200*b* may irradiate a beam along a travel direction (or driving direction) of a moving device, and an angle of the beam may be adjusted according to a road condition. A signal interference between beams may be avoided by setting different wavelengths of beams output from the transmitting devices 200*a* and 200*b* at a point where roads cross each other. In addition, a direction or angle of a beam output from the transmitting devices 200*a* and 200*b* may be adjusted according to a road condition.

Referring to FIG. 6, the moving device 500*a* may receive a plurality of transmit beams with different wavelengths transmitted from the plurality of transmitting devices 200*a* and 200*b* through the transmit beam detection module 310 of the receiving device 300*a* (S105).

The moving device 500*a* may receive a laser beam emitted from the transmitting devices 200*a* and 200*b* through the transmit beam detection module 310 that is installed at the back.

Next, the reception controller 340 of the receiving device 300*a* may select a transmit beam with an intensity equal to or above a threshold among a plurality of transmit beams and recognize the transmit beam as a trigger signal (S110).

In case there is a plurality of transmit beams with an intensity equal to or above the threshold, the reception controller 340 may finally receive a transmit beam with a greatest intensity, for example. The reception controller 340 may interwork with an internal trigger based on a time when the final transmit beam is received.

Next, the reception controller 340 may obtain beam trigger information based on a trigger signal (S115).

The trigger signal may be a signal for initiating an analysis of information associated with an object beam, which is received after the transmit beam, and operate as an internal trigger in the receiving device 300. The reception controller 340 may obtain beam trigger information to be referenced for generating Lidar data by analyzing the trigger signal. The beam trigger information may include a reception time of a trigger signal, wavelength information of a transmit beam, and the like.

As an example different from that of FIG. 6, the beam trigger information may be delivered from the transmitting device 200*a*. For example, the reception controller 340 may select beam trigger information with the same wavelength information as that of an object beam received at a subsequent step, among pieces of beam trigger information received from the plurality of transmitting devices 200*a* and 200*b*. For example, the beam trigger information may include wavelength information of the beam, an irradiation time of the beam, and location information of the transmitting device 200. As yet another example, even when receiving the trigger signal, the reception controller 340 may further receive beam trigger information from the transmitting device 200*a* in order to accurately generate Lidar data.

Next, the object beam detection module 320 of the receiving device 300*a* may receive an object beam with a same wavelength as that of a transmit beam, and the reception controller 340 may obtain beam scan information from the transmit beam (S120).

In the present disclosure, a detector of the transmit beam detection module 310 may be configured as an array fast detector or a quadrant fast detector, and the transmit beam detection module 310 may identify at least one of an irradiation direction of a transmit beam, an angle of the transmit beam, and an emitting position of the transmit beam. The reception controller 340 may obtain beam scan information based on the irradiation direction, angle and emitting position thus identified.

As another example different from the example of FIG. 6, a detector of the transmit beam detection module 320 may be configured as a wide-angle detector based on a single sensor. In this case, even when receiving a transmit beam, the detector cannot identify the irradiation direction, the angle, and the emitting position. In this case, at a request or by radio transmission of the transmitting device 200, the reception controller 340 may receive beam scan information from the transmitting device associated with an object beam.

Next, the reception controller 340 may generate Lidar data based on beam scan information, beam trigger information, and a reception time of an object beam (S125).

Based on the trigger signal, the reception controller 340 may calculate a time difference between the trigger signal and the object beam received from the object beam detection module 320 placed in front of the moving device 500 at a point where the moving device is currently located and thus produce a distance to the target 400 from which the object beam is reflected.

The reception controller 340 may calculate a time difference by connecting an object beam and a trigger signal, identify an angle change according to a position of a beam identified through the detector 324, and thus generate a three-dimensional image of a surrounding environment.

Next, when the moving device 300*a* keeps running to be away from the transmitting device 300*a* and passes by another transmitting device 200*b*, the intensity of a transmit beam and/or an object beam of the transmitting device 200*a* may be lowered to or below the threshold. In this case, when the intensity of a transmit beam (or an object beam) received from the transmitting device 200*a* is below the threshold and the intensity of a beam newly received from another transmitting device 200*b*, the reception controller 340 may change a transmit beam to be received from the beam of the transmitting device 200*a* to the beam of another transmitting device 200*b*. The reception controller 340 may generate Lidar data based on information obtained from the changed transmit beam and a corresponding object beam.

According to the present disclosure, the transmitting device 200 for Lidar and the receiving device 300 for Lidar, which constitute the Lidar system 100, may be configured as unit apparatuses independent from each other and be installed in physically separate objects. As a result, the receiving device 300 mounted on a plurality of moving devices 500 may share a beam signal and a scan signal of an expensive transmitting device that is separately installed in a neighboring object of the moving devices 500. Thus, while the production cost of a Lidar system, which is mostly incurred by a transmission function, may be reduced, Lidar data thus obtained may still be the same as the one from an existing system.

Even when the receiving device 300 is operated in separation from the transmitting device 200, the receiving device 300 may directly receive a beam signal of the transmitting device or identify a beam emitting time of the beam signal through beam trigger information that is received via wireless communication. The receiving device 300 may identify an angle and direction of an object beam received after being reflected from the target 400 or obtain a location pattern of the object beam based on beam scan information received through wireless communication. Accordingly, the Lidar system 100 according to the present disclosure may generate Lidar data with the actually same performance as achieved by an existing Lidar apparatus that accommodates transmitting and receiving modules in a single housing.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A receiving apparatus for Lidar installed in a moving device and separated from a transmitting apparatus for Lidar fixed to a fixed body, the receiving apparatus for Lidar comprising:

an object beam detector configured to detect an object beam which is a beam received after being transmitted from the transmitting apparatus for Lidar and reflected from a neighboring object of the moving device; and a reception controller configured to generate Lidar data based on information associated with the transmitted beam and a signal of the object beam, wherein the reception controller is further configured to:

obtain an intensity of light according to the object beam and a reception time of the object beam, based on the signal of the object beam, and generate the Lidar data, based on the intensity of light, the reception time and the information associated with the transmitted beam.

2. The receiving apparatus for Lidar of claim 1, further comprising a transmit beam detector configured to detect a beam transmitted directly to the receiving apparatus for Lidar as a transmit beam among beams of the transmitting apparatus for Lidar, wherein the transmit beam detector is further configured to identify at least one of an irradiation direction of the transmit beam, an angle of the transmit beam, an emitting position of the transmit beam, an emitting time of the transmit beam and an emitting repetition rate of the transmit beam, and wherein information obtained from the transmit beam is beam scan information that includes at least one of the irradiation direction, the angle, the emitting position, the emitting time and the emitting repetition rate.

3. The receiving apparatus for Lidar of claim 2, wherein the reception controller is further configured to recognize the transmit beam as a trigger signal and to generate the Lidar data by referring to the beam scan information obtained from the transmit beam, the trigger signal, and the signal of the object beam, and wherein the trigger signal is a signal initiating an analysis of the signal of the object beam and includes wavelength information of the transmit beam.

4. The receiving apparatus for Lidar of claim 2, wherein the transmit beam detector is provided to detect the transmit beam behind the moving device along a travel direction of the moving device, and the object beam detector is provided to detect the object beam in front of the moving device.

5. The receiving apparatus for Lidar of claim 1, wherein the information associated with the transmitted beam is beam scan information that is transmitted from the transmitting apparatus for Lidar through a communication unit of the receiving apparatus for Lidar, wherein the reception controller is further configured to generate the Lidar data by referring to the beam scan information and the signal of the object beam, and wherein the beam scan information includes at least one of an irradiation direction of the beam, an angle of the beam, an emitting position of the beam, and an emitting repetition rate of the beam.

6. The receiving apparatus for Lidar of claim 5, wherein the information associated with the transmitted beam further includes beam trigger information that is transmitted from the transmitting apparatus for Lidar through the communication unit of the receiving apparatus for Lidar, wherein the reception controller is further configured to generate the Lidar data by referring to the beam scan information, the beam trigger information and the signal of the object beam, and wherein the beam trigger information includes an emitting time of the beam and a wavelength of the beam.

7. The receiving apparatus for Lidar of claim 1, wherein, when there is a plurality of the transmitting apparatuses for Lidar, beams of different wavelengths are output for each of transmitting apparatuses for Lidar, and wherein the reception controller is further configured to select a beam with an intensity equal to or above a threshold as the information associated with the transmitted beam among beams received from each of the transmitting apparatuses for Lidar.

8. The receiving apparatus for Lidar of claim 7, wherein, in response to an already received beam having an intensity below the threshold and a newly received beam having an intensity equal to or above the threshold, which is from another transmitting apparatus for Lidar different from a transmitting apparatus for Lidar outputting the already received beam, the reception controller is further configured to:

change the information associated with the transmitted beam from the already received beam to the newly received beam, and generate Lidar data based on the changed information and a signal obtained from an object beam that is received after being reflected by the newly received beam.

9. A Lidar system comprising at least one transmitting apparatus for Lidar and a receiving apparatus for Lidar that are operated in separation from each other, wherein the transmitting apparatus for Lidar is installed to be fixed to a fixed body and comprises:

a light emitter configured to output a light;

a beam scanner configured to outwardly irradiate the output light as a beam; and a transmission controller configured to control the light emitter and the beam scanner, and wherein the receiving apparatus for Lidar is installed in a moving device and comprises:

an object beam detector configured to detect an object beam which is a beam received after being transmitted from the transmitting apparatus for Lidar and reflected from a neighboring object of the moving device; and a reception controller configured to generate Lidar data based on information associated with the transmitted beam and a signal of the object beam.

10. The Lidar system of claim 9, wherein the receiving apparatus for Lidar further comprises a transmit beam detector configured to detect, among beams of the transmitting apparatus for Lidar, a beam transmitted directly to the receiving apparatus for Lidar as a transmit beam, wherein the transmit beam detector is configured to identify at least one of an irradiation direction of the transmit beam, an angle of the transmit beam, an emitting position of the transmit beam, an emitting time of the transmit beam, and an emitting repetition rate of the transmit beam, and wherein information obtained from the transmit beam is beam scan information that includes at least one of the irradiation direction, the angle, the emitting position, the emitting time, and the emitting repetition rate.

11. The Lidar system of claim 10, wherein the reception controller is further configured to recognize the transmit beam as a trigger signal and to generate the Lidar data by referring to the beam scan information obtained from the transmit beam, the trigger signal, and the signal of the object beam, and wherein the trigger signal is a signal initiating an analysis of the signal of the object beam and includes wavelength information of the transmit beam.

12. The Lidar system of claim 9, wherein the information associated with the transmitted beam is beam scan information and beam trigger information that are transmitted from the transmitting apparatus for Lidar through a communication unit of the receiving apparatus for Lidar, wherein the reception controller is further configured to generate the Lidar data by referring to the beam scan information, the beam trigger information and the signal of the object beam, wherein the beam scan information includes at least one of an irradiation direction of the beam, an angle of the beam, an emitting position of the beam and an emitting repetition rate of the beam, and wherein the beam trigger information the irradiation time of the beam and the wavelength of the beam.

13. The Lidar system of claim 9, wherein the transmission controller is further configured to control the light emitter to output a light with any one wavelength among a plurality of wavelengths to the beam scanner, and wherein, when there is a plurality of the transmitting apparatuses for Lidar are spaced apart from each other, the transmission controller is further configured to control the light emitter to output a light with a wavelength different from a wavelength of a beam irradiated from the transmitting apparatuses for Lidar that are spaced apart from each other.

14. The Lidar system of claim 9, wherein the light emitter comprises:

a plurality of source light sources;

a first light amplifier combined with each of the source light sources and provided for each of the plurality of wavelengths and amplifies a light of the source light sources;

a pumping light source that adds a pumping light to the light in order to amplify the light of the source light sources; and a second light amplifier provided for each of the plurality of wavelengths and reamplifying the amplified light by inputting the amplified light and the pumping light and outputting the reamplified light to the beam scanner.

15. The Lidar system of claim 9, wherein the transmission controller is further configured to transmit, to the receiving apparatus for Lidar, beam scan information, which is for reference in order to generate Lidar data based on the beam received by the receiving apparatus for Lidar, and wherein the beam scan information includes at least one of an irradiation direction of the beam, an angle of the beam, an emitting position of the beam, an emitting time of the beam, and an emitting repetition rate of the beam.

16. The Lidar system of claim 9, wherein the transmission controller is further configured to transmit, to the receiving apparatus for Lidar, beam trigger information, which is for reference in order to generate Lidar data based on the beam received by the receiving apparatus for Lidar, and wherein the beam trigger information includes an irradiation time of the beam and wavelength information of the beam.

17. A receiving apparatus for Lidar installed in a moving device and separated from a transmitting apparatus for Lidar fixed to a fixed body, the receiving apparatus for Lidar comprising:

an object beam detector configured to detect an object beam which is a beam received after being transmitted from the transmitting apparatus for Lidar and reflected from a neighboring object of the moving device;

a transmit beam detector configured to detect a beam transmitted directly to the receiving apparatus for Lidar as a transmit beam among beams of the transmitting apparatus for Lidar; and a reception controller configured to generate Lidar data based on information associated with the transmitted beam and a signal of the object beam, wherein the transmit beam detector is further configured to identify at least one of an irradiation direction of the transmit beam, an angle of the transmit beam, an emitting position of the transmit beam, an emitting time of the transmit beam and an emitting repetition rate of the transmit beam, and wherein information obtained from the transmit beam is beam scan information that includes at least one of the irradiation direction, the angle, the emitting position, the emitting time and the emitting repetition rate.

* * * * *